(12) United States Patent
Terashita

(10) Patent No.: US 10,631,155 B2
(45) Date of Patent: *Apr. 21, 2020

(54) COMMUNICATION APPARATUS

(71) Applicant: BROTHER KOGYO KABUSHIKI KAISHA, Nagoya, Aichi (JP)

(72) Inventor: Kunihito Terashita, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,731

(22) Filed: Apr. 2, 2019

(65) Prior Publication Data

US 2019/0268745 A1   Aug. 29, 2019

Related U.S. Application Data

(63) Continuation of application No. 15/079,343, filed on Mar. 24, 2016, now Pat. No. 9,706,342, and a (Continued)

(30) Foreign Application Priority Data

Mar. 27, 2015 (JP) ................................. 2015-066064

(51) Int. Cl.
*H04B 7/00* (2006.01)
*H04W 4/80* (2018.01)
(Continued)

(52) U.S. Cl.
CPC ............ *H04W 4/80* (2018.02); *H04N 1/3278* (2013.01); *H04N 1/32786* (2013.01);
(Continued)

(58) Field of Classification Search
CPC ...... H04W 4/008; H04W 48/16; H04W 88/06
(Continued)

(56) References Cited

U.S. PATENT DOCUMENTS 8,811,966 B2 * 8/2014 Sakata .................... H04W 4/40
455/418
2009/0247077 A1 * 10/2009 Sklovsky ................ G06F 9/445
455/41.1
(Continued)

FOREIGN PATENT DOCUMENTS

JP   2013-214139 A   10/2013
JP   2014-053007 A    3/2014
(Continued)

OTHER PUBLICATIONS

"Wi-Fi Peer-to-Peer (P2P) Technical Specification", Wi-Fi Alliance Technical Committee P2P Task Group, Oct. 4, 2010, 159 pages, Version 1.1.
(Continued)

*Primary Examiner* — Md K Talukder
(74) *Attorney, Agent, or Firm* — Scully, Scott, Murphy & Presser, PC

(57) ABSTRACT

A communication apparatus may determine whether specific apparatus identification information for identifying a specific external apparatus is stored in a memory in a case where the specific apparatus identification information is received via a second interface from the specific external apparatus, shift an operating state of the communication apparatus from a non-parent station state to a parent station state in a case where it is determined that the specific apparatus identification information is stored in the memory, receive a wireless connection request from the specific external apparatus via a first interface after the operating state has been shifted from the non-parent station state to the parent station state, and form the wireless network in which the communication apparatus operates as the parent station and the specific external apparatus operates as a child
(Continued)

station, in a case where the wireless connection request is received from the specific external apparatus.

20 Claims, 8 Drawing Sheets

Related U.S. Application Data continuation of application No. 15/985,183, filed on May 21, 2018, now Pat. No. 10,292,032, which is a continuation of application No. 15/635,991, filed on Jun. 28, 2017, now Pat. No. 9,986,126, which is a continuation of application No. 15/079,343, filed on Mar. 24, 2016, now Pat. No. 9,706,342.

(51) Int. Cl.
*H04W 48/16* (2009.01)
*H04N 1/327* (2006.01)
*H04N 1/333* (2006.01)
*H04W 88/06* (2009.01)
*H04W 84/12* (2009.01)

(52) U.S. Cl.
CPC ........ *H04N 1/33346* (2013.01); *H04W 48/16* (2013.01); *H04N 2201/0031* (2013.01); *H04N 2201/0082* (2013.01); *H04N 2201/3205* (2013.01); *H04W 84/12* (2013.01); *H04W 88/06* (2013.01); *Y02D 70/142* (2018.01); *Y02D 70/144* (2018.01); *Y02D 70/166* (2018.01); *Y02D 70/22* (2018.01)

(58) Field of Classification Search
USPC .................................. 455/41.1, 41.2, 41.3
See application file for complete search history.

(56) References Cited

U.S. PATENT DOCUMENTS

| | | |
|---|---|---|
| 2013/0258390 A1 | 10/2013 | Suzuki et al. |
| 2014/0049894 A1* | 2/2014 | Rihn ..................... G06F 1/1616 361/679.27 |
| 2014/0080469 A1* | 3/2014 | Ko .......................... H04W 8/22 455/418 |
| 2014/0098671 A1* | 4/2014 | Raleigh ................... H04L 69/14 370/235 |
| 2014/0104635 A1 | 4/2014 | Nishikawa |
| 2014/0368863 A1 | 12/2014 | Suzuki et al. |
| 2015/0289077 A1* | 10/2015 | Ko .......................... H04W 8/22 455/420 |
| 2015/0317116 A1 | 11/2015 | Suzuki et al. |
| 2016/0286344 A1* | 9/2016 | Terashita ................ H04W 4/80 |
| 2016/0323825 A1* | 11/2016 | Yamaji ................... H04W 4/80 |
| 2017/0013547 A1* | 1/2017 | Skaaksrud ............. H04W 4/80 |
| 2017/0026544 A1 | 1/2017 | Suzuki et al. |
| 2017/0366702 A1 | 12/2017 | Suzuki et al. |

FOREIGN PATENT DOCUMENTS

| | | |
|---|---|---|
| JP | 2014078866 A | 5/2014 |
| JP | 2015019350 A | 1/2015 |

OTHER PUBLICATIONS

Notice of Allowance dated May 9, 2017 from parent application U.S. Appl. No. 15/079,343.
Office Action dated Sep. 7, 2017 from parent application U.S. Appl. No. 15/635,991.
Notice of Allowance dated Jan. 24, 2018 from parent application U.S. Appl. No. 15/635,991.
Official Action dated Jul. 31, 2018 received from the Japanese Patent Office in related JP 2015-066064.
Office Action dated Sep. 5, 2018 from related parent application U.S. Appl. No. 15/985,183.
Notice of Allowance dated Jan. 9, 2019 from related parent application U.S. Appl. No. 15/985,183.

* cited by examiner

FIG. 1
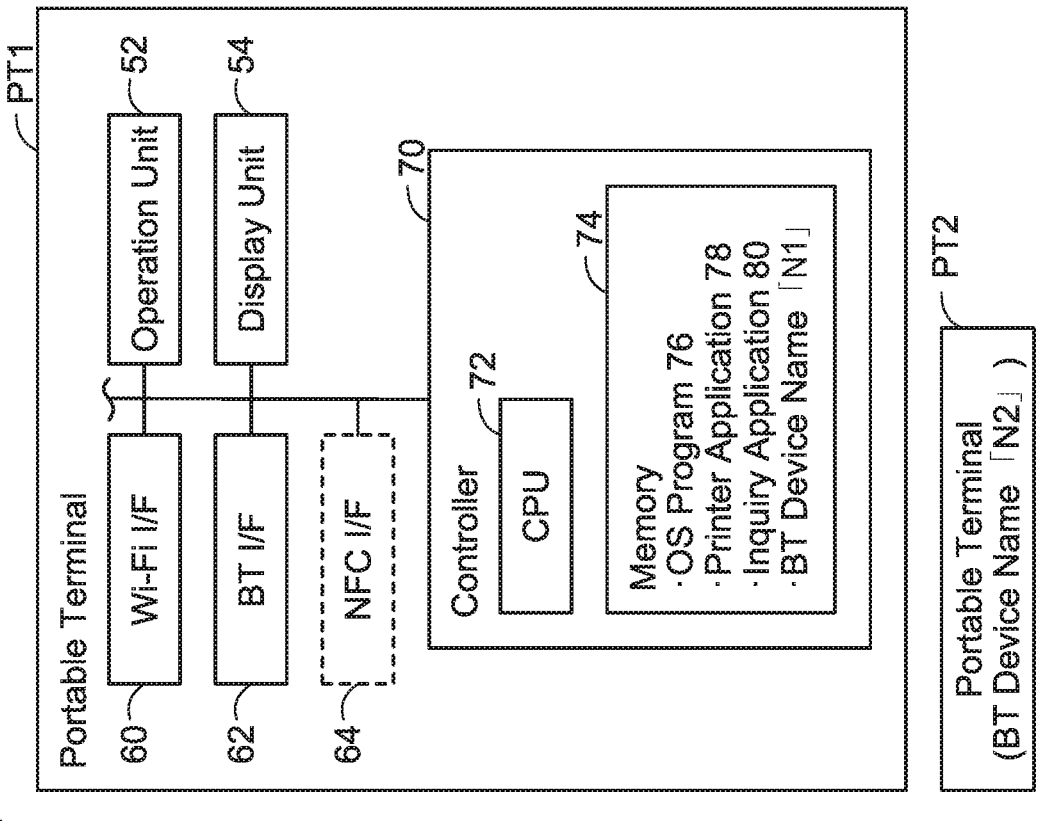
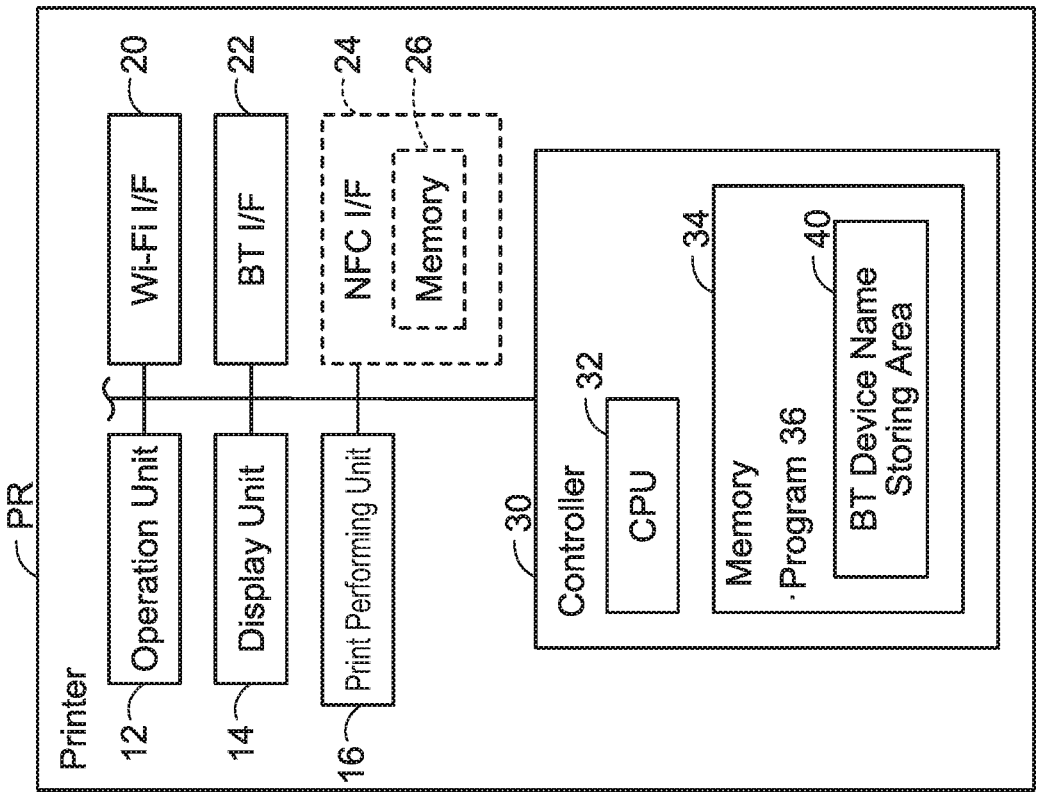

FIG. 4 (First Embodiment : Case A)

(Second Embodiment : Case D2)   Thin Line Arrows : BT Communication
Broken Line Arrows : NFC Communication

COMMUNICATION APPARATUS

CROSS-REFERENCE TO RELATED APPLICATION

This application is a continuation application of U.S. Ser. No. 15/985,183 filed on May 21, 2018, which is a continuation application of U.S. Ser. No. 15/635,991 filed on Jun. 28, 2017, now U.S. Pat. No. 9,986,126 granted Mar. 29, 2018, which is a continuation application of U.S. Ser. No. 15/079,343 filed on Mar. 24, 2016, now U.S. Pat. No. 9,706,342 and claims priority to Japanese Patent Application No. 2015-066064, filed on Mar. 27, 2015, the entire contents of which are hereby incorporated by reference into the present application.

TECHNICAL FIELD

The present application discloses a communication apparatus capable of performing a wireless communication according to a plurality of communication schemes.

BACKGROUND ART

Technology for performing a wireless communication between a first terminal and an external apparatus according to Wi-Fi is known. The first terminal sends, to the external apparatus via a BLE (abbreviation of Bluetooth (registered trademark) Low Energy), information (i.e. a MAC address, an SSID, a channel number, a security key, and so forth) related to AP (abbreviation of an access point) to which the first terminal itself is connected. In this case, the external apparatus activates a Wi-Fi module, and uses the above information to connect to the AP. This makes it possible for the first terminal and the external apparatus to perform a wireless communication according to Wi-Fi.

SUMMARY

As described above, a technology in which a wireless communication is performed according to Wi-Fi after a wireless communication has been performed via BLE is known. In the present application, a technology that may perform a wireless communication appropriately according to a plurality of communication schemes is provided.

A communication apparatus may comprise a first interface configured to perform a wireless communication according to a first communication scheme; a second interface configured to perform a wireless communication according to a second communication scheme different from the first communication scheme; a processor; and a memory configured to store apparatus identification information for identifying an external apparatus with which a wireless connection via the first interface was established, wherein the memory may be configured to further store computer-readable instructions therein, the computer-readable instructions, when executed by the processor, causing the communication apparatus to perform: determining whether specific apparatus identification information for identifying a specific external apparatus is stored in the memory in a case where the specific apparatus identification information is received via the second interface from the specific external apparatus; shifting an operating state of the communication apparatus from a non-parent station state to a parent station state in a case where it is determined that the specific apparatus identification information is stored in the memory, the parent station state being a state in which the communication apparatus operates as a parent station of a wireless network for performing a wireless communication via the first interface, and the non-parent station state being a state different from the parent station state, wherein the operating state of the communication apparatus may be maintained in the non-parent station state in a case where it is determined that the specific apparatus identification information is not stored in the memory; receiving a wireless connection request from the specific external apparatus via the first interface after the operating state of the communication apparatus has been shifted from the non-parent station state to the parent station state; and establishing a first wireless connection with the specific external apparatus via the first interface so as to form the wireless network in which the communication apparatus operates as the parent station and the specific external apparatus operates as a child station, in a case where the wireless connection request is received from the specific external apparatus.

A control method and computer-readable instructions for implementation of the communication apparatus described above, and a non-transitory computer-readable recording medium in which the computer-readable instructions are stored, are also novel and useful. Moreover, a communication system comprising the communication apparatus described above and specific external apparatus is also novel and useful.

BRIEF DESCRIPTION OF DRAWINGS

FIG. 1 shows a configuration of a communication system.

Figure 2:
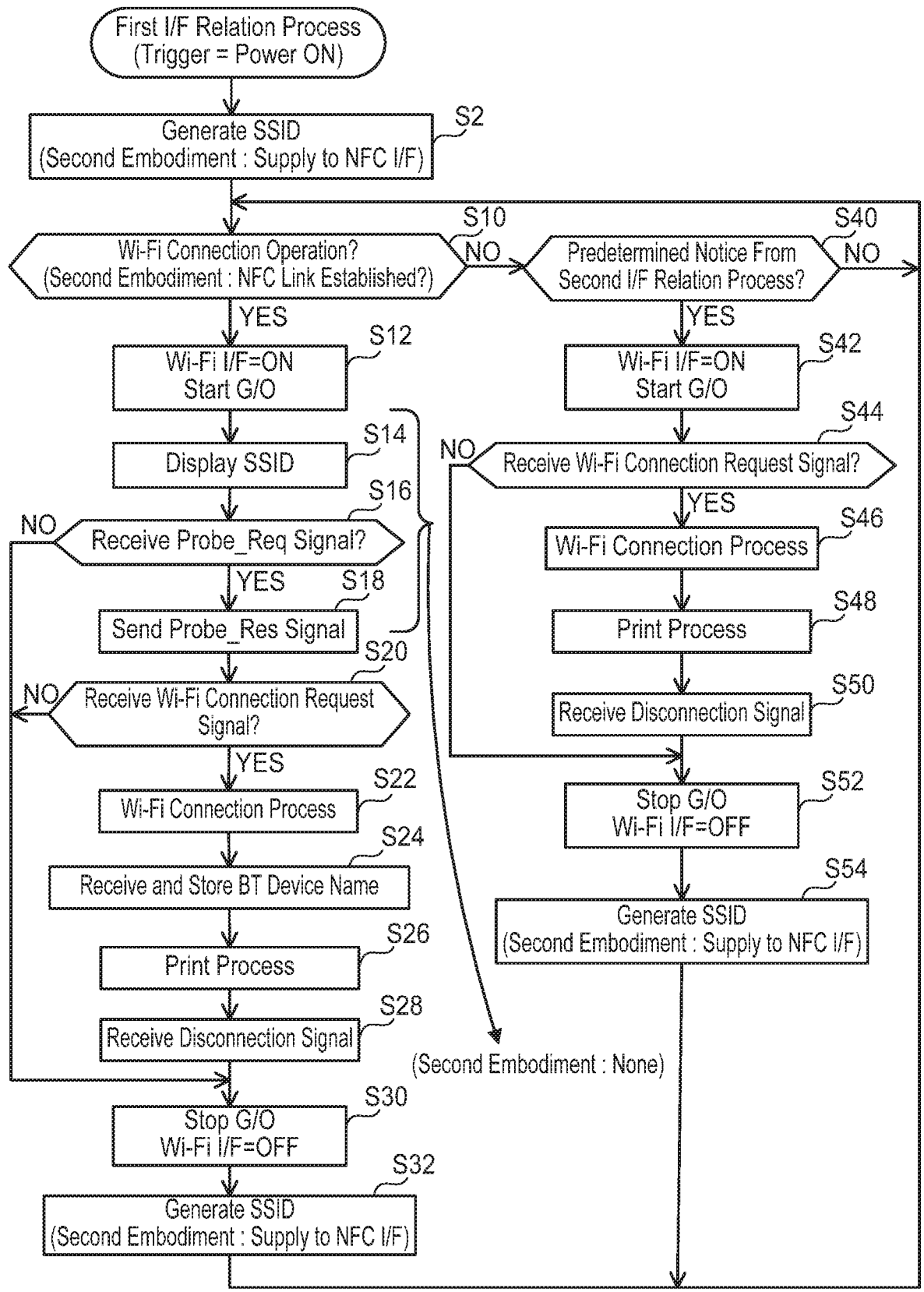
FIG. 2 shows a flowchart of a first I/F relation process.

EMBODIMENTS (First Embodiment)
(Configuration of Communication System 2)

As shown in FIG. 1, a communication system 2 comprises a printer PR and a plurality of portable terminals PT1 and PT 2. The printer PR and the portable terminals PT1 and PT 2 are able to perform a wireless communication with one another.

(Configuration of Printer PR)

The printer PR is a peripheral device that is capable of performing a print function, that is, a peripheral device such as the portable terminal PT1. The printer PR comprises an operation unit 12, a display unit 14, a print performing unit 16, a Wi-Fi interface 20, a BT (abbreviation for Bluetooth (registered trademark)) interface 22, and a controller 30. Each of the units 12 to 30 is connected to a bus line (reference sign omitted). Hereinafter, an interface will be called "I/F". Furthermore, a near field communication (NFC) I/F 24 is also disclosed in FIG. 1, but the NFC I/F 24 is an I/F that is used in a second embodiment that will be explained below, and may or may not be disposed in the printer PR of the first embodiment.

The operation unit 12 comprises a plurality of keys. A user can input various instructions into the printer PR by operating the operation unit 12. The display unit 14 is a display for displaying various information. The display unit 14 also functions as a so-called touch panel. That is, the display unit 14 also functions as an operation unit operated by the user. The print performing unit 16 is a printing mechanism such as an inkjet system or laser system.

The Wi-Fi I/F 20 is an I/F for performing a wireless communication according to a Wi-Fi scheme (hereinafter called "Wi-Fi communication"). The Wi-Fi scheme, for example, is a wireless communication scheme based on The Institute of Electrical and Electronics Engineers, Inc. (IEEE) standard 802.11, and standards conforming thereto (e.g. 802.11a, 11b, 11g, 11n, and so forth). More specifically, the Wi-Fi I/F 20 supports a WFD (abbreviation of Wi-Fi Direct (registered trademark)) scheme formulated by a Wi-Fi Alliance. The WFD scheme is a wireless communication scheme described in a "Wi-Fi Peer-to-Peer (P2P) Technical Specification Version 1.1" prepared by the Wi-Fi Alliance.

The BT I/F 22 is an I/F for performing a wireless communication (hereinafter called "BT communication") according to a Bluetooth scheme. The Bluetooth scheme, for example, is a wireless communication scheme based on IEEE standard 802.1.5, and standards conforming thereto. More specifically, the BT I/F 22 supports BLE (abbreviation of Bluetooth Low Energy). The BLE is a standard that is realized using version 4.0 or a later version of the Bluetooth scheme. Hereinafter, Bluetooth version lower than 4.0 will be called "classic BT". In order for a BT communication to be performed according to BLE between a pair of BT I/Fs, the one BT I/F may support "Bluetooth Smart Ready" established using the BT scheme, and the other BT I/F may support "Bluetooth Smart Ready" or "Bluetooth Smart" established using the BT scheme. A BT I/F that supports "Bluetooth Smart Ready" is an I/F that is capable of performing both a BLE operation and a classic BT operation (i.e. a so-called dual mode I/F). A BT I/F that supports "Bluetooth Smart" is an I/F that is capable of performing a BLE operation, but is not capable of performing a classic BT operation. In the present embodiment, a BT communication according to BLE is performed between the printer PR and the portable terminals PT1 and PT 2. Then, since the BT I/F (e.g. reference sign 62) of the portable terminals PT1 and PT 2, which will be explained below, supports "Bluetooth Smart Ready", the BT I/F 22 of the printer PR may support whichever of "Bluetooth Smart Ready" and "Bluetooth Smart". However, in a variation, the BT I/F of the portable terminals PT1 and PT 2 may support "Bluetooth Smart" when the BT I/F 22 of the printer PR supports "Bluetooth Smart Ready".

The points of difference between classic BT and BLE will be described. The number of BLE channels (i.e. 40) is less than the number of classic BT channels (i.e. 79). Current consumption of a BLE (e.g. 15 mA) at the time of a data communication is less than the current consumption of a classic BT (e.g. 35 mA) at the time of a data communication. Therefore, BLE power consumption is lower than the power consumption of the classic BT. Also, an Advertise signal is used in BLE, but an Advertise signal is not used in classic BT.

The points of difference between the Wi-Fi scheme and the BT scheme will be described. The communication speed of a Wi-Fi communication (e.g. a maximum communication speed of 600 Mbps) is faster than the communication speed of a BT communication (e.g. maximum communication speed of 24 Mbps). The frequency of the carrier wave in a Wi-Fi communication is either a 2.4 GHz range or a 5.0 GHz range. The frequency of the carrier wave in a BT communication is the 2.4 GHz range. That is, in a case where the 5.0 GHz range is used as the carrier wave frequency in a Wi-Fi communication, the carrier wave frequency in the Wi-Fi communication differs from the carrier wave frequency in the BT communication. Furthermore, the maximum distance over which a Wi-Fi communication can be performed (e.g. approximately 100 m) is greater than the maximum distance over which a BT communication can be performed (e.g. roughly several tens of meters).

The controller 30 comprises a CPU 32 and a memory 34. The CPU 32 performs various processes in accordance with a program 36 stored in the memory 34. The memory 34 is configured by a volatile memory and a nonvolatile memory. The memory 34 comprises a BT device name storing area 40. The BT device name storing area 40 is an area for storing the name of the BT device of a portable terminal to which a wireless connection via the Wi-Fi I/F 20, that is, a wireless connection according to the Wi-Fi scheme has been established (hereinafter called "connection-established terminal").

(Configuration of Portable Terminals PT1 and PT 2)

The portable terminals PT1 and PT 2, for example, are portable terminal devices such as mobile telephones (e.g. smart phones), PDAs, notebook PCs, tablet PCs, portable music players, and portable video players. The configuration of the portable terminal PT1 will be explained below, but portable terminal PT 2 comprises the same configuration as that of portable terminal PT1.

The portable terminal PT1 comprises an operation unit 52, a display unit 54, a Wi-Fi I/F 60, a BT I/F 62, and a controller 70. Each of the units 52 to 70 is connected to a bus line (reference sign omitted). Furthermore, an NFC I/F 64 is an I/F used in the second embodiment which will be explained below, and may or may not be disposed in the portable terminal PT1 of the first embodiment.

The operation unit 52 comprises a plurality of keys. A user can input various instructions into the portable terminal PT1 by operating the operation unit 52. The display unit 54 is a display for displaying various information. The display unit 54 also functions as a so-called touch panel (i.e. also functions as an operation unit). The Wi-Fi I/F 60 is an I/F for performing a Wi-Fi communication. The Wi-Fi I/F 60 may or may not support WFD. The BT I/F 62 is an I/F for performing a BT communication, and supports BLE. The differences between the respective I/Fs 60 and 62 are the same as the differences between the respective I/Fs 20 and 22 of the printer PR.

The controller 70 comprises a CPU 72 and a memory 74. The CPU 72 performs various processes in accordance with an OS program 76 stored in the memory 74. The memory 74 is configured by a volatile memory and a nonvolatile memory. The memory 74 not only stores the OS program 76, but also a printer application 78 and an inquiry application 80. The printer application 78 is an application for causing a print function to be performed on the printer PR. The printer application 78 is started by the user when the user wishes to cause a print function to be performed on the printer PR. The inquiry application 80 is an application for monitoring the receiving of a Scan_Res signal, which will be explained below, in accordance with a BT communication, and displaying an inquiry screen in accordance with receiving the Scan_Res signal. The inquiry application 80 is a so-called resident application, and is always running while the power supply to the portable terminal PT1 is ON. The applications 78 and 80, for example, may be installed in the portable terminal PT1 from an Internet server provided by the vendor of the printer PR, or may be installed in the portable terminal PT1 from storage media shipped together with the printer PR. The memory 74 also stores a BT device name "N1" beforehand. The BT device name "N1" is a unique name allocated to the BT I/F 62, in other words, it is a name used as information for identifying the portable terminal PT1 in order for the portable terminal PT1 to perform a BT communication. Furthermore, the portable terminal PT 2 has the BT device name "N2", which differs from the BT device name "N1".

(First I/F Relation Process of Printer PR; FIG. 2)

Next, a first I/F relation process performed by the CPU 32 of the printer PR will be explained by referring to FIG. 2. The first I/F relation process is a process related primarily to the Wi-Fi I/F 20. The CPU 32 commences the process of FIG. 2 when the power supply of the printer PR is turned ON.

In S2, the CPU 32 generates SSID (abbreviation of a service set identifier) by randomly generating a character string. Then, the CPU 32 causes the SSID to be stored in the memory 34. The SSID is an identifier for identifying a wireless network for performing a Wi-Fi communication.

Next, the CPU 32 sequentially performs the monitoring processes of S10 and S40. In S10, the CPU 32 monitors for a Wi-Fi connection operation to be performed by the user on either the operation unit 12 or the display unit 14 (i.e. the touch panel) of the printer PR. The Wi-Fi connection operation is an operation for establishing a wireless connection according to the Wi-Fi scheme (hereinafter called "Wi-Fi connection") between the printer PR and a portable terminal (e.g. PT1). The Wi-Fi connection operation is not an operation performed by a user of the connection-established terminal, but rather is normally performed by a user of a portable terminal for which a Wi-Fi connection with the printer PR was not established in the past. The CPU 32 determines YES in S10 when the Wi-Fi connection operation is performed, and proceeds to S12.

In S12, the CPU 32 changes the Wi-Fi I/F 20 from the OFF state to the ON state. As used here, the OFF state of the Wi-Fi I/F 20 is a state in which power is not being supplied to the Wi-Fi I/F 20, that is, a state in which a Wi-Fi communication cannot be performed. The ON state of the Wi-Fi I/F 20 is a state in which power is being supplied to the Wi-Fi I/F 20, that is, a state in which a Wi-Fi communication can be performed.

In S12, the CPU 32 spontaneously causes the operating state of the printer PR to shift from a device state of WFD to a G/O (abbreviation of group owner) state without performing a WFD G/O negotiation. When in the G/O state, the printer PR sends a beacon signal via the Wi-Fi I/F 20 to inform surrounding apparatuses of its existence. On the other hand, when in a state other than the G/O state (e.g. the aforementioned device state or a client state), the printer PR does not send a beacon signal. Thus, the power consumption of the printer PR when in the G/O state is higher than the power consumption of the printer PR when in a state other than the G/O state.

In S14, the CPU 32 obtains the SSID from the memory 34, and causes the display unit 14 to display the obtained SSID. This makes it possible for the user to find out the SSID required for establishing a Wi-Fi connection with the printer PR by looking at the display unit 14. Furthermore, as described above, the SSID is stored in the memory 34 in S2. However, when S32 or S54, which will be described below, are performed after S2 was performed, a new SSID is stored in the memory 34 in place of an old SSID in the memory 34.

Therefore, in a situation in which neither S32 nor S54 has been performed after S2 was performed, the SSID displayed in S14 is the SSID that was generated in S2. In a situation in which either S32 or S54 has been performed after S2 was performed, the SSID displayed in S14 is a new SSID that was generated in either S32 or S54. Hereinafter, the SSID currently stored in the memory 34 will be called "current SSID".

In S16, the CPU 32 determines whether or not a Probe Request signal (hereinafter written as "Probe_Req signal") has been received from the portable terminal via the Wi-Fi I/F 20. The Probe_Req signal is a broadcast transmission signal from the portable terminal, and more specifically, is a signal for searching for a G/O state apparatus and an AP that exist around the portable terminal. The CPU 32 determines YES in S16 when the Probe_Req signal has been received, and proceeds to S18. On the other hand, the CPU 32 determines NO in S16 when a Probe_Req signal has not been received during a predetermined period of time after S14 has ended, skips S18 to S28, and advances to S30.

In S18, the CPU 32 sends a Probe Response signal (hereinafter written as "Probe_Res signal") including the current SSID to a portable terminal via the Wi-Fi I/F 20. The Probe_Res signal is a response signal to the Probe_Req signal. The portable terminal, upon receiving the Probe_Res signal, displays the SSID included in the Probe_Res signal on the display unit of the portable terminal. At this point, the user of the portable terminal is able to ascertain that the SSID being displayed on the display unit of the portable terminal is a SSID of which apparatus by comparatively checking the SSID being displayed on the display unit of the portable terminal to the SSID that was displayed on the display unit 14 of the printer PR in S14 described above, and may select the current SSID of the printer PR. This makes it possible for the user to instruct the portable terminal to send a Wi-Fi connection request signal, which will be explained below.

In S20, the CPU 32 determines whether or not a Wi-Fi connection request signal including the current SSID has been received from the portable terminal via the Wi-Fi I/F 20. The Wi-Fi connection request signal is a signal for requesting the PR to establish a Wi-Fi connection, and more specifically, is an Association Request signal. The CPU 32 determines of YES in S20 when a Wi-Fi connection request signal including the current SSID has been received, and proceeds to S22. On the other hand, the CPU 32 determines of NO in S20 when a Wi-Fi connection request signal including the current SSID has not been received during a predetermined period of time after S18 has ended, skips S22 to S28, and advances to S30.

In S22, the CPU 32 establishes a wireless connection via the Wi-Fi I/F 20 (i.e. a Wi-Fi connection) with the portable terminal. Specifically, the CPU 32 performs a communication with the portable terminal via the Wi-Fi I/F 20 using various types of signals (e.g. sends an Association Response signal, communicates a 4-way Handshake, and so forth). The CPU 32, in the process of communicating the aforementioned various types of signals, receives Wi-Fi setting information including the SSID and a password from the portable terminal and performs an authentication of the Wi-Fi setting information. The CPU 32 determines that the authentication of the Wi-Fi setting information has been successful and establishes a Wi-Fi connection with the portable terminal in a case where the received SSID is identical to the current SSID, and the received password is identical to a predetermined password. As used here, the predetermined password is a fixed character string that has been set in the printer PR beforehand. That is, in the present embodiment, when the power supply to the printer PR is turned ON and either S32 or S54, which will be explained below, is performed, the SSID changes, but the password does not change.

As explained above, a Wi-Fi connection is established between the printer PR and the portable terminal in S22. Consequently a wireless network of Wi-Fi-scheme (hereinafter written as "Wi-Fi network") in which the printer PR operates in the G/O state and the portable terminal operates as a so-called legacy, is formed. Legacy signifies an apparatus that participates in the Wi-Fi network without performing a WFD operation. Since the printer PR that is in the G/O state manages a Wi-Fi network, printer PR that is the G/O-state can be called a parent station (in other words, a master device) of the Wi-Fi network. Also, since the portable terminal participates in the Wi-Fi network as a legacy, the legacy portable terminal can be called a child station (in other words, a slave device) of the Wi-Fi network.

In S24, the CPU 32 uses the Wi-Fi network (i.e. uses the Wi-Fi connection) so as to receive the portable terminal BT device name from the portable terminal via the Wi-Fi I/F 20. Then, the CPU 32 causes the received BT device name to be stored in the BT device name storing area 40. Consequently, the CPU 32 causes the BT device name of the connection-established terminal to be stored in the BT device name storing area 40.

In S26, the CPU 32 uses the Wi-Fi network so as to receive print data representing an image to be printed from the portable terminal via the Wi-Fi I/F 20. Then, the CPU 32 supplies the print data to the print performing unit 16, and causes the print performing unit 16 to print in accordance with the print data.

In S28, the CPU 32 uses the Wi-Fi network so as to receive a disconnection signal from the portable terminal via the Wi-Fi I/F 20. The disconnection signal is a signal for requesting the disconnection of the Wi-Fi connection. As a result of this, the Wi-Fi connection between the printer PR and the portable terminal is disconnected.

In S30, the CPU 32 causes the operating state of the printer PR to shift from the G/O state to the device state. This makes it possible to reduce the power consumption of the printer PR. In S30, the CPU 32 also changes the Wi-Fi I/F 20 from the ON state to the OFF state. This makes it possible to reduce the power consumption of the printer PR.

In S32, the CPU 32 generates a new SSID, and causes the new SSID to be stored in the memory 34 in place of the old SSID in the memory 34. That is, the CPU 32 changes the SSID. Therefore the security of the Wi-Fi network may be enhanced since the SSID changes each time the printer PR stops the G/O state. When S32 ends, the CPU 32 returns to S10.

The CPU 32 advances to S40 when it determines NO in S10. In S40, the CPU 32 monitors for obtaining of a predetermined notice (refer to S90 of FIG. 3) from a second I/F relation process on FIG. 3 which will be explained below. The predetermined notice is a notice that is obtained from the second I/F relation process in a case where a Scan_Req signal is received from the connection-established terminal in accordance with a BT communication. The CPU 32 determines YES in S40 when the predetermined notice is obtained, and proceeds to S42.

S42 and S44, respectively, are the same as S12 and S20 of FIG. 2. In the case of YES in S44, the CPU 32 proceeds to S46. The CPU 32 determines NO in S44 in a case where a Wi-Fi connection request signal has not been received during a predetermined period of time after S42 has ended, skips S46 to S50, and advances to S52. S46 to S54 are the same as S22, and S26 to S32. When S54 ends, the CPU 32 returns to S10.

Figure 3:
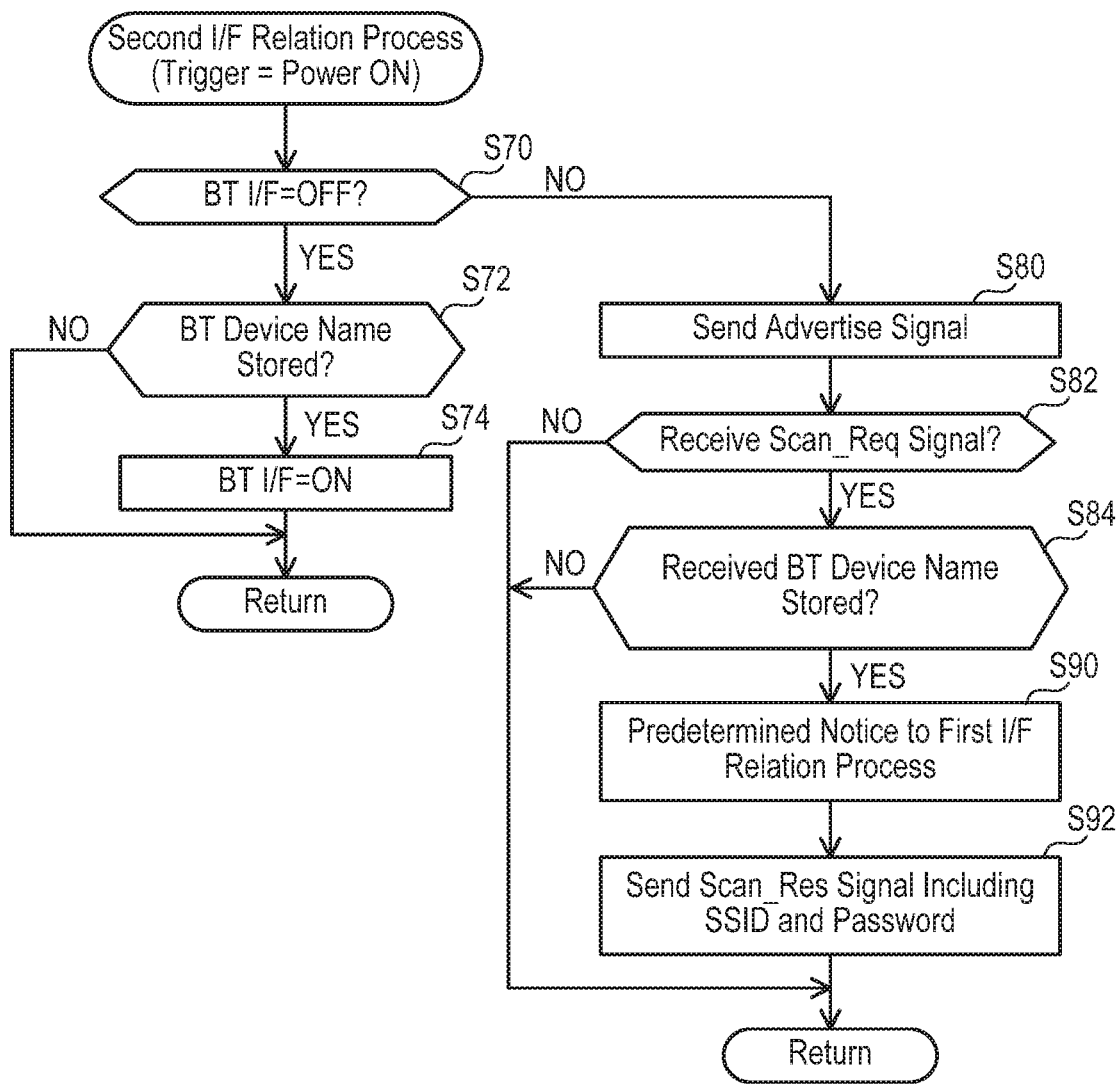
FIG. 3 shows a flowchart of a second I/F relation process.

(Second I/F Relation Process of Printer PR; FIG. 3)

Next, a second I/F relation process performed by the CPU 32 of the printer PR will be explained by referring to FIG. 3. The second I/F relation process is a process related primarily to the BT I/F 22. The CPU 32 starts the process of FIG. 3 when the power supply to the printer PR is turned ON.

In S70, the CPU 32 determines whether or not the BT I/F 22 is in the OFF state. The CPU 32 determines YES in S70 and proceeds to S72 in a case where the CPU 32 inquires the state of the BT I/F 22 of the BT I/F 22 and obtains information indicating the OFF state from the BT I/F 22, and CPU 32 determines NO in S70 and proceeds to S80 in a case where the CPU 32 obtains information indicating the ON state from the BT I/F 22. Here the OFF state of the BT I/F 22 is a state in which power is not supplied to the BT I/F 22, that is, a state in which a BT communication cannot be performed. The ON state of the BT I/F 22 is a state in which power is being supplied to the BT I/F 22, that is, a state in which a BT communication can be performed. The power consumption (i.e. the power consumption of the BLE) of the BT I/F 22 in the ON state is lower than the power consumption of the Wi-Fi I/F 20 in the ON state.

In S72, the CPU 32 determines whether or not one or more BT device names are stored in the BT device name storing area 40 in the memory 34. The CPU 32 determines YES in S72 in a case where one or more BT device names are stored, and in S74, changes the BT I/F 22 from the OFF state to the ON state. Since the BT I/F 22 can be set to the OFF state until the BT I/F 22 is changed to the ON state in S74, the power consumption of the printer PR can be reduced. When S74 ends, the CPU 32 returns to S70. On the other hand, in a case where no BT device names are stored, the CPU 32 determines NO in S72 and returns to S70 without performing S74.

In S80 (i.e. the BT I/F 22 is in the ON state), the CPU 32 broadcasts an Advertise signal via the BT I/F 22. The Advertise signal is a signal for notifying apparatuses around the printer PR of the printer's existence. In particular, the CPU 32 sends the Advertise signal to the exterior without establishing a Bluetooth logical link (i.e. a Bluetooth-scheme wireless connection). More specifically, in a Bluetooth protocol stack, the signal is sent to the exterior by a communication of a layer lower than an L2CAP layer (i.e. Link Manager layer or Link Layer layer) being performed without a communication of a layer higher than or equal to the L2CAP layer being performed. The L2CAP layer is a highest layer for establishing a Bluetooth logical link. That is, the Advertise signal is sent to the exterior by a communication of a lower layer which is lower than the highest layer for establishing a logical link being performed without a communication of the highest layer being performed.

In S82, the CPU 32 determines whether or not a Scan Request signal (hereinafter written as "Scan_Req signal") was received from the portable terminal via the BT I/F 22. The Scan_Req signal is a unicast signal sent from the portable terminal that received the Advertise signal. The Scan_Req signal is a signal for requesting Wi-Fi setting information including the SSID and the password to the printer PR. In particular, the CPU 32 is able to receive the Scan_Req signal even without establishing a logical link. That is, the Scan_Req signal is received from the exterior by a communication being performed at a lower layer than a highest layer for establishing a logical link without a communication being performed at the highest layer. The CPU 32 determines YES in S82 and proceeds to S84 in a case where the Scan_Req signal has been received. The Scan_Req signal includes the BT device name of the portable terminal that is the source of the Scan_Req signal. On the other hand, when a Scan_Req signal has not been received during a predetermined period of time after S80 has ended, the CPU 32 determines NO in S82, skips S84, S90 and S92, and returns to S70.

In S84, the CPU 32 determines whether or not the BT device name included in the Scan_Req signal received in S82 is stored in the BT device name storing area in the memory 34. The CPU 32 determines YES in S84 and proceeds to S90 in a case where the BT device name is stored in the BT device name storing area, that is, in a case where the portable terminal that is the source of the Scan_Req signal is the connection-established terminal. On the other hand, the CPU 32 determines NO in S84, skips S90 and S92, and returns to S70 in a case where the BT device name is not stored in the BT device name storing area, that is, in a case where a Wi-Fi connection has not been established in the past with the portable terminal that is the source of the Scan_Req signal.

In S90, the CPU 32 supplies a predetermined notice to the first I/F relation process (refer to FIG. 2). Consequently, the Wi-Fi I/F 20 is changed to the ON state, and the operating state of the printer PR is shifted to the G/O state (YES in S40, and S42 of FIG. 2)

In S92, the CPU 32 sends a Scan Response signal (hereinafter written as "Scan_Res signal") via the BT I/F 22 to the portable terminal that is the source of the Scan_Req signal. The Scan_Res signal is a response signal to the Scan_Req signal, and in the present embodiment, includes the current SSID and a predetermined password (i.e. a fixed character string set in the printer PR beforehand). The CPU 32 sends the Scan_Res signal without establishing a logical link. That is, the Scan_Res signal is sent to the exterior by a communication being performed at a lower layer than a highest layer for establishing a logical link without a communication being performed at the highest layer. When S92 ends, the CPU 32 returns to S70.

Furthermore, as described above, a determination of NO is made in S70, and S80 is performed once again when S82 is NO, S84 is NO, or S70 is performed once again after S92. That is, the CPU 32 repeats a broadcast transmission of the Advertise signal.

(Specific Cases)

Figure 4:
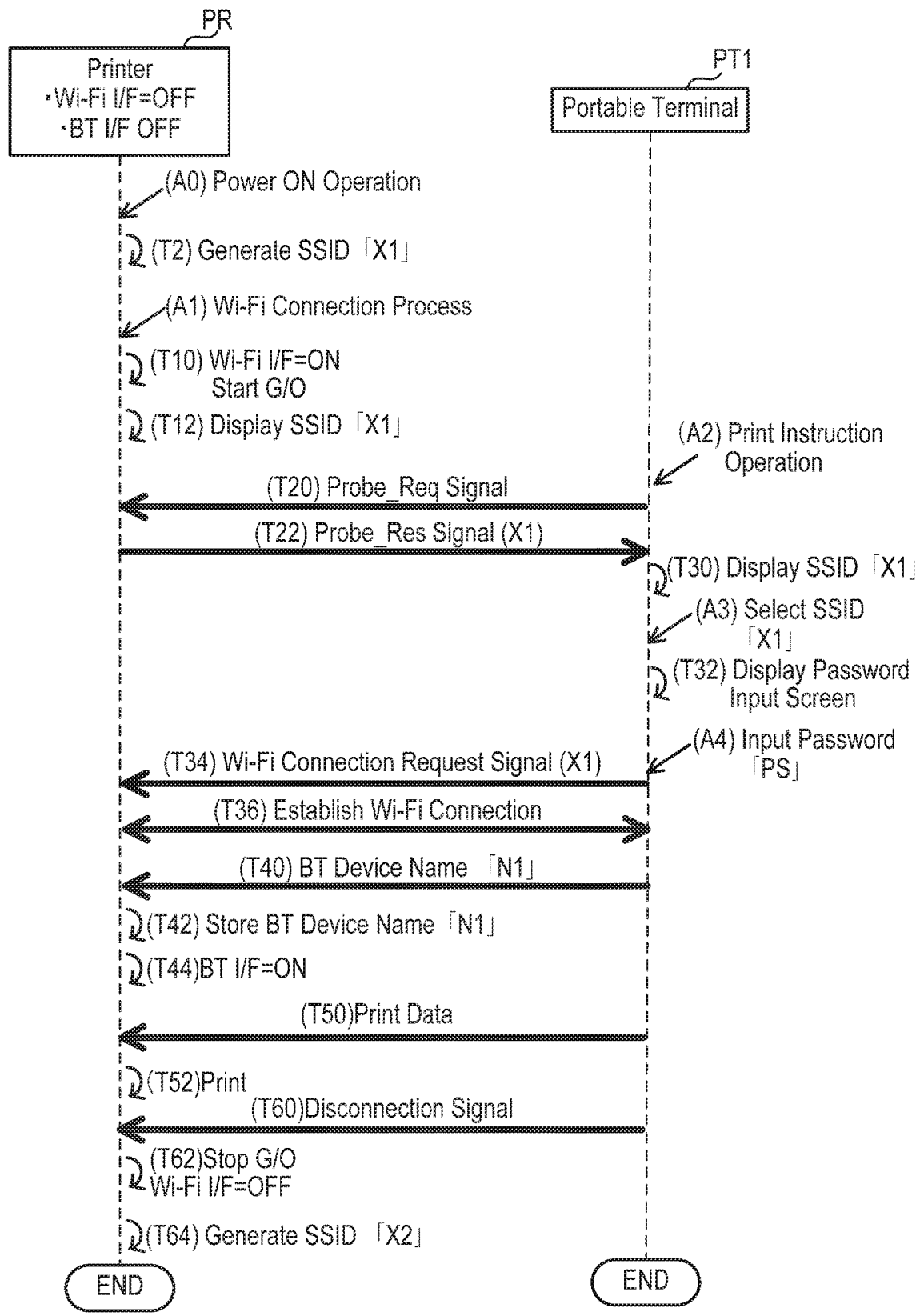
FIG. 4 shows a sequence chart for a case A of a first embodiment.
Figure 5:
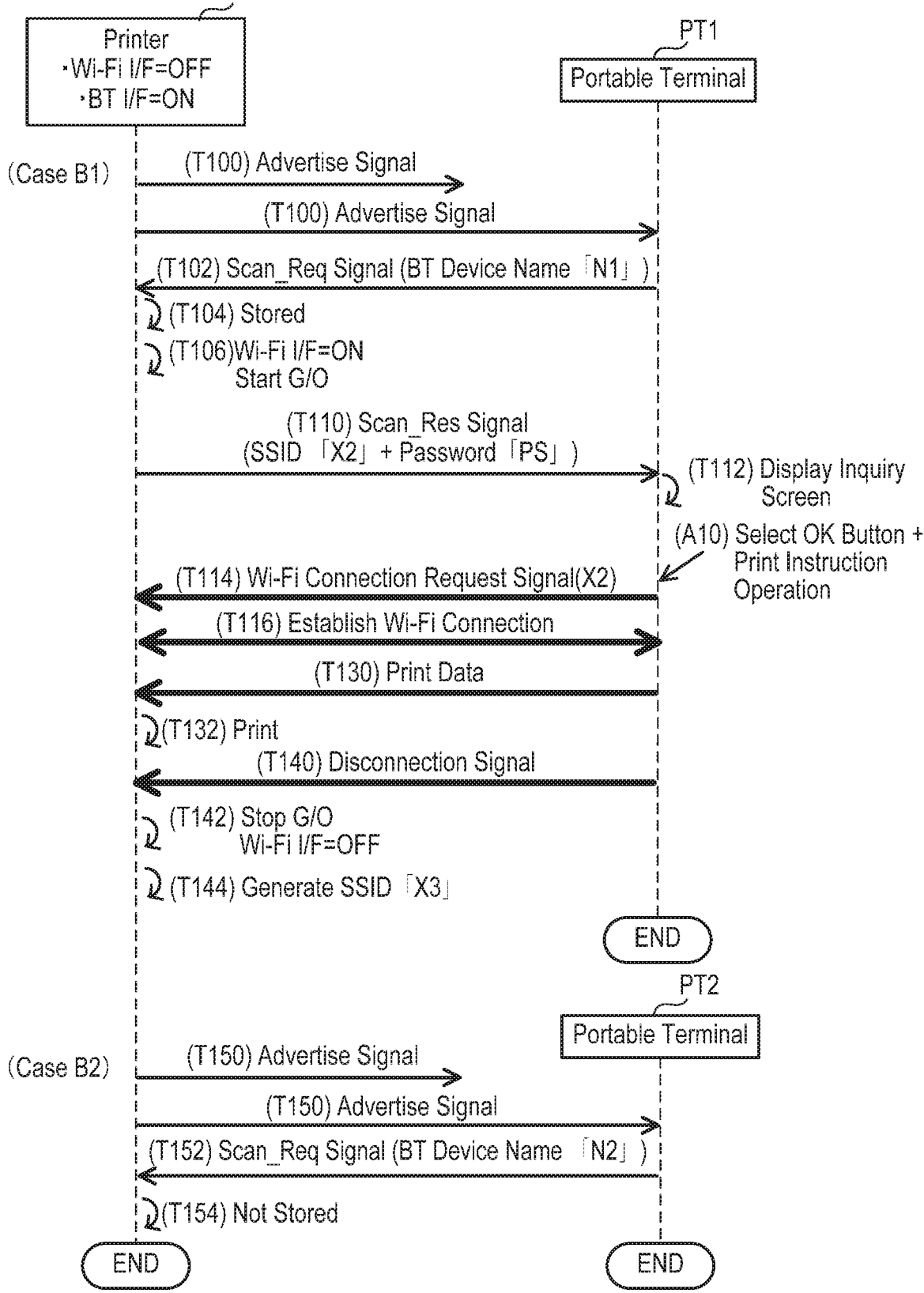
FIG. 5 shows sequence charts for cases B1 and B2 of the first embodiment.

Next, specific cases realized by the processes of FIGS. 2 and 3 will be explained by referring to FIGS. 4 and 5. In FIGS. 4 and 5, thick line arrows and thin line arrows between the printer PR and the portable terminals PT1 and PT 2, respectively, indicate Wi-Fi communications and BT communications.

(Case A; FIG. 4) In an initial state of a case A, the power to the printer PR is turned OFF. In addition, the portable terminal PT1 has not established a Wi-Fi connection with the printer PR in the past. That is, the BT device name "N1" of the portable terminal PT1 is not stored in the BT device name storing area 40 in the memory 34 of the printer PR. Furthermore, no portable terminal BT device names are stored in the BT device name storing area 40.

In A0, the power supply to the printer PR is turned ON by the user. In this case, in T2, the printer PR generates an SSID "X1" (S2 in FIG. 2).

In A1, a Wi-Fi connection operation is performed on the printer PR by the user of the portable terminal PT1. In this case, in T10, the printer PR changes the Wi-Fi I/F 20 to the ON state and shifts to the G/O state (S12 in FIG. 2), and in T12, displays the SSID "X1" (S14).

In A2, a print instruction operation is performed on the portable terminal PT1 by the user. The print instruction operation includes an operation for activating the printer application 78, and an operation for specifying a file (i.e. the print data) representing the image to be printed. The following processes (i.e. T20, T30, and so forth) performed by the portable terminal PT1 are realized using the printer application 78. In T20, the portable terminal PT1 broadcasts the Probe_Req signal.

The printer PR, in a case where the Probe_Req signal is received from the portable terminal PT1 (YES in S16 of FIG. 2), in T22, sends the Probe_Res signal including the SSID "X1" to the portable terminal PT1 (S18). Furthermore, in a case where the print instruction operation of A2 is not performed on the portable terminal PT1, the Probe_Req signal is not sent from the portable terminal PT1, and as a result the printer PR determines NO in S16 of FIG. 2.

The portable terminal PT1, in a case where the Probe_Res signal is received from the printer PR, in T30, displays the SSID "X1" included in the Probe_Res signal. Furthermore, in a case where the portable terminal PT1 further receives a Probe_Res signal from a different apparatus than the printer PR, the portable terminal PT1 displays not only the SSID "X1", but also a SSID included in that Probe_Res signal. That is, in T30, the portable terminal PT1 displays one or more SSIDs including the SSID "X1". At this point, by comparing the one or more SSIDs displayed on the portable terminal PT1 to the SSID "X1" displayed on the printer PR in the above-described T12, the user can confirm the SSID "X1" of the printer PR from among the aforementioned one or more SSIDs.

In A3, an operation for selecting the SSID "X1" from among the one or more SSIDs is performed on the portable terminal PT1 by the user. In this case, in T32, the portable terminal PT1 displays a password input screen for inputting the password. For example, the printer PR administrator notifies the user of the portable terminal PT1 beforehand as to the predetermined password "PS" of the printer PR. In A4, an operation for inputting the password "PS" is performed on the portable terminal PT1 by the user. In this case, in T34, the portable terminal PT1 sends, to the printer PR, a Wi-Fi connection request signal including the SSID "X1" selected in A3. Furthermore, in a case where an SSID that differs from the SSID "X1" is selected in A3 and/or the operation is canceled without the password being inputted in A4, the Wi-Fi connection request signal is not sent from the portable terminal PT1, and as a result, the printer PR determines NO in S20 of FIG. 2.

The printer PR, in a case where the Wi-Fi connection request signal is received from the portable terminal PT1 (YES in S20 of FIG. 2), in T36, establishes a Wi-Fi connection with the portable terminal PT1 (S22). Furthermore, in the T36 process, the printer PR receives from the portable terminal PT1 Wi-Fi setting information including the SSID "X1" and the password "PS", performs an authentication of the Wi-Fi setting information, and because the authentication is successful in this case, establishes a Wi-Fi connection with the portable terminal PT1. Consequently, a Wi-Fi network in which the printer PR operates as the parent station and the portable terminal PT1 operates as the child station is formed.

The portable terminal PT1, after the Wi-Fi connection with the printer PR has been established, in T40, uses the Wi-Fi connection so as to send the printer PR the BT device name "N1" of the portable terminal PT1.

The printer PR, in a case where the BT device name "N1" is received from the portable terminal PT1, in T42, stores the BT device name "N1" in the BT device name storing area 40 (S24 of FIG. 2). As a result, in T44, the printer PR changes the BT I/F 22 to the ON state (YES in S70, YES in S72, and S74 of FIG. 3).

The portable terminal PT1, after sending the BT device name "N1" to the printer PR, in T50, uses the Wi-Fi connection so as to send the printer PR the print data specified in A2.

The printer PR, in a case where the print data is received from the portable terminal PT1, in T52, performs a print process according to the print data (S26 of FIG. 2). Furthermore, a configuration in which the printer PR receives the print data from the portable terminal PT1 using a BT communication is conceivable. However, there is a possibility that the print data may be large in size, and, in addition, and the communication speed of a BT communication is slower than the communication speed of a Wi-Fi communication. Therefore, in a case that employs the configuration in which a BT communication is used to communicate the print data, the print data communication may take a long time. By contrast, in the present embodiment, a Wi-Fi communication is used to communicate the print data, thereby making it possible to communicate the print data quickly.

The portable terminal PT1, after sending the print data to the printer PR, in T60, sends a disconnection signal for disconnecting the Wi-Fi connection to the printer PR.

The printer PR, in a case where the disconnection signal is received from the portable terminal PT1 (S28 in FIG. 2), in T62, shifts from the G/O state to the device state, and changes the Wi-Fi I/F 20 to the OFF state (S30). Then, in T64, the printer PR generates an SSID "X2" that differs from the SSID "X1" (S32).

(Case B1; FIG. 5)

A case B1 of FIG. 5 is a continuation of the case A, and the Wi-Fi I/F 20 is in the OFF state (refer to T62 of FIG. 4) and the BT I/F 22 is in the ON state (refer to T44). Furthermore, the printer application 78 is not running on the portable terminal PT1, which is the connection-established terminal, but the inquiry application 80 is running.

In T100, the printer PR sends the Advertise signal (S80 of FIG. 3). In a case where the distance between the printer PR and the portable terminal PT1 is greater than the maximum distance (e.g. approximately several tens of meters) over which a BT communication can be performed, the Advertise signal is not received by the portable terminal PT1, and as a result the Scan_Req signal is not sent to the printer PR from the portable terminal PT1. Therefore, the printer PR repeatedly sends the Advertise signal (NO in S82, NO in S70, and S80 of FIG. 3).

As described above, when one or more BT device names are stored in the BT device name storing area 40, the BT I/F 22 is in the ON state (refer to T44 of FIG. 4), and the printer PR repeatedly sends the Advertise signal (T100). On the other hand, when no BT device names are stored, the printer PR maintains the BT I/F 22 in the OFF state and does not send the Advertise signal (No in S72 and YES in S70 of FIG. 3). Thus, the printer PR is able to realize power savings.

When the user approaches the printer carrying the portable terminal PT1, the distance between the printer PR and the portable terminal PT1 becomes less than the maximum distance over which the BT communication can be performed. In this case, the portable terminal PT1 receives the Advertise signal from the printer PR, and in T102, sends the Scan_Req signal including the BT device name "N1" of the portable terminal PT1, to the printer PR. Furthermore, the process of T102 may be realized by either the inquiry application 80 or the OS program 76.

The printer PR, in a case where the Scan_Req signal is received from the portable terminal PT1 (YES in S82 of FIG. 3), in T104, determines that the BT device name "N1" included in the Scan_Req signal is stored in the BT device name storing area 40 (YES in S84). Therefore, in T106, the printer PR changes the Wi-Fi I/F 20 to the ON state, and shifts to the G/O state (S90 of FIG. 3, YES in S40, and S42 of FIG. 2). Next, in T110, the printer PR sends the Scan_Res signal including the SSID "X2" generated in T64 of FIG. 4 and the predetermined password "PS" (S92 of FIG. 3) to the portable terminal PT1.

The portable terminal PT1 (i.e. the inquiry application 80) monitors for the receiving of the Scan_Res signal from the printer PR, and upon receiving the Scan_Res signal, in T112, displays an inquiry screen. The inquiry screen is a screen for inquiring of the user as to whether or not to establish a Wi-Fi connection between the printer PR and the portable terminal PT1, and includes an OK button and a cancel button. In A10, an operation for selecting the OK button in the inquiry screen is performed on the portable terminal PT1 by the user, and, in addition, the print instruction operation is performed on the portable terminal PT1 by the user. The print instruction operation is the same as that of A2 in FIG. 4. Then, in T114, the portable terminal PT1 sends the Wi-Fi connection request signal including the SSID "X2" received in T110 to the printer PR, without displaying the screen for selecting the SSID (refer to T30 of FIG. 4) and the password input screen (refer to T32). These screens are not displayed because the SSID "X2" and the password "PS" were received in T110. Thus, the user is able to easily establish the second and subsequent Wi-Fi connection between the printer PR and the portable terminal PT1. Furthermore, in a case where an operation for selecting the cancel button in the inquiry screen is performed, the Wi-Fi connection request signal is not sent from the portable terminal PT1, and as a result, the printer PR determines NO in S44 of FIG. 2.

The printer PR, in a case where the Wi-Fi connection request signal is received from the portable terminal PT1 (YES in S44 of FIG. 2), in T116, establishes the Wi-Fi connection with the portable terminal PT1 (S46). T116 is the same as T36 of FIG. 4 except for the fact that the SSID "X2" and the password "PS" received in T110 are used.

As described above, in a case where the OK button in the inquiry screen displayed on the portable terminal PT1 is selected (A10), the printer PR receives the Wi-Fi connection request signal from the portable terminal PT1 (T114), and established the Wi-Fi connection with the portable terminal PT1 (T116). Therefore, the printer PR is able to establish the Wi-Fi connection with the portable terminal PT1, which is the connection-established terminal, in accordance with the intentions of the user of the portable terminal PT1.

T130, T132, T140, T142 and T144, which are performed following T116, are the same as T50, T52, T60, T62, and T64, respectively, of FIG. 4 (S48 to S54 of FIG. 2). Furthermore, in T144, an SSID "X3" is generated.

(Case B2)

A case B2 is also a continuation of the case A. The BT device name "N2" of the portable terminal PT 2 is not stored in the BT device name storing area 40 in the memory 34 of the printer PR. In the portable terminal PT 2, the printer application 78 is not running, but the inquiry application 80 is running.

In T150, the printer PR repeatedly sends the Advertise signal the same as in T100 (S80 of FIG. 3). When the distance between the printer PR and the portable terminal PT 2 becomes less than the maximum distance over which it is possible to perform the BT communication, the portable terminal PT 2 receives the Advertise signal from the printer PR, and in T152, sends the Scan_Req signal including the BT device name "N2" of the portable terminal PT 2, to the printer PR. Furthermore, the processing of T152 may be realized by either the inquiry application 80 or the OS program 76.

The printer PR, in a case where the Scan_Req signal is received from the portable terminal PT 2 (YES in S82 of FIG. 3), in T154, determines that the BT device name "N2" included in the Scan-Req signal is not stored in the BT device name storing area 40 (NO in S84). Therefore, the printer PR maintains the Wi-Fi I/F 20 in the OFF state and does not shift to the G/O state. Therefore, the power consumption of the printer PR can be reduced. Also, the printer PR does not send Wi-Fi setting information including the SSID "X2" and the password "PS" to the portable terminal PT2. Therefore, it is possible to suppress the supplying of the Wi-Fi setting information, for example, to the portable terminal PT2, which has not been given permission to use the printer PR by the printer PR administrator.

(Effects of the Present Embodiment)

As shown in the case B2 of FIG. 5, in a case where the BT device name "N2" received in accordance with the BT communication is not stored in the BT device name storing area 40 (T154), that is, in a case where the Wi-Fi connection has not been established with the portable terminal PT2 in the past, the possibility of establishing a Wi-Fi connection with the portable terminal PT2 is low, and as such, the printer PR maintains the Wi-Fi I/F 20 in the OFF state, and maintains the device state without shifting to the G/O state. Therefore, the printer PR is able to realize power savings. On the other hand, as shown in the case B1, in a case where the BT device name "N1" received in accordance with the BT communication is stored in the BT device name storing area 40 (T104), that is, in a case where the Wi-Fi connection has been established with the portable terminal PT1 in the past, the possibility of establishing a Wi-Fi connection with the portable terminal PT1 is high, and as such, the printer PR changes the Wi-Fi I/F 20 to the ON state and shifts to the G/O state (T106). This makes it possible for the printer PR to appropriately establish the Wi-Fi connection with the portable terminal PT1 in a case where the Wi-Fi connection request is received from the portable terminal PT1 which is the connection-established terminal (T114). Thus, the printer PR is able to appropriately perform wireless communications according to a plurality of communication schemes including the Wi-Fi scheme and the BT scheme (T116).

(Corresponding Relationships)

The printer PR and the portable terminals PT1 and PT2, respectively, are examples of a "communication apparatus" and "specific external apparatus". The Wi-Fi scheme and the Wi-Fi I/F 20, respectively, are examples of a "first communication scheme" and a "first interface". The BT scheme and the BT I/F 22, respectively, are examples of a "second communication scheme" and a "second interface". The BT device names "N1" and "N2" are examples of "specific apparatus identification information". The device state and the G/O state, respectively, are examples of a "non-parent station state" and a "parent station state". The Wi-Fi I/F 20 OFF state and ON state, respectively, are examples of a "first state" and a "second state". The Advertise signal is an example of a "specific signal".

Also, the Wi-Fi connection established in T116 of FIG. 5 and the Wi-Fi connection established in T36 of FIG. 4, respectively, are examples of a "first wireless connection" and a "second wireless connection". The SSID "X2" and the password "PS" included in the Scan_Req signal sent in T110 of FIG. 5 are examples of "first network-related information". The selection of the OK button in A10 of FIG. 5 is an example of a "predetermined instruction".

(Second Embodiment)

A second embodiment will be explained by focusing on the points of difference with the first embodiment. As shown in FIG. 1, the printer PR comprises an NFC I/F 24 for performing the wireless communication according to an NFC scheme (hereinafter called "NFC communication"). The NFC I/F 24 comprises a memory 26. The NFC I/F 24 is constantly maintained in the ON state while the power supply to the printer PR is ON (i.e. power is constantly supplied to the NFC I/F 24). In addition, each of the portable terminals PT1 and PT2 also comprises an NFC I/F 64.

The NFC scheme is a wireless communication scheme for a so-called near field wireless communication, and, for example, is the wireless communication scheme based on international standard ISO/IEC 21481 or 18092. The communication speed of the NFC communication (e.g. a maximum communication speed of 424 Kbps) is slower than the communication speed of the BT communication (e.g. a maximum communication speed of 24 Mbps). In the NFC communication, the frequency of the carrier wave (e.g. the 13.56 MHz range) differs from that of a Wi-Fi communication carrier wave frequency (e.g. either the 2.4 GHz range or the 5.0 GHz range) and that of a BT communication carrier wave frequency (e.g. the 2.4 GHz range). Also, the maximum distance over which it is possible to perform the NFC communication (e.g. approximately 10 cm) is shorter than the maximum distance over which it is possible to perform the BT communication (e.g. approximately several tens of meters).

(First I/F Relation Process of Printer PR; FIG. 2)

A first I/F relation process of the present embodiment will be explained by referring to FIG. 2. S2, S10, S14 to S18, S32 and S54 differs from those in the first embodiment.

In S2, the CPU 32 generates an SSID, causes the SSID to be stored in the memory 34, and, in addition, supplies the SSID to the NFC I/F 24. Consequently, the SSID is stored in the memory 26 of the NFC I/F 24. Similarly, in S32 and S54, the CPU 32 supplies a SSID to the NFC I/F 24. Consequently, the new SSID is stored in the memory 26 of the NFC I/F 24 in place of the old SSID.

In S10, the CPU 32 monitors for a communication link to be established via the NFC I/F 24 (hereinafter called "NFC link"). The CPU 32 determines of YES in S10 and proceeds to S12 when information indicating that the NFC link has been established is obtained from the NFC I/F 24. In the present embodiment, S14 to S18 are not performed. Therefore, when S12 ends, the CPU 32 proceeds to S20.

(Specific Cases)

Figure 6:
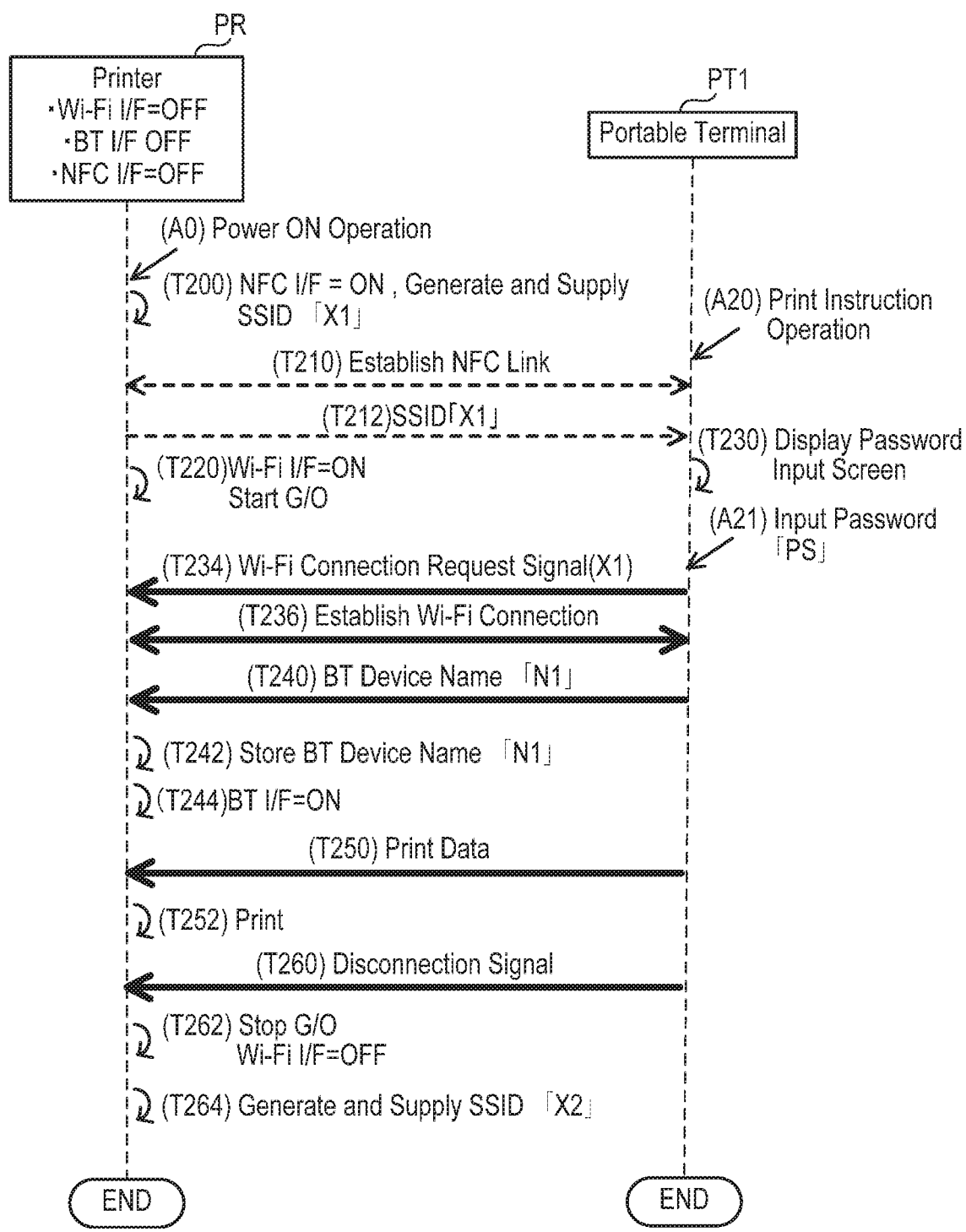
FIG. 6 shows a sequence chart for a case C of a second embodiment.
Figure 7:
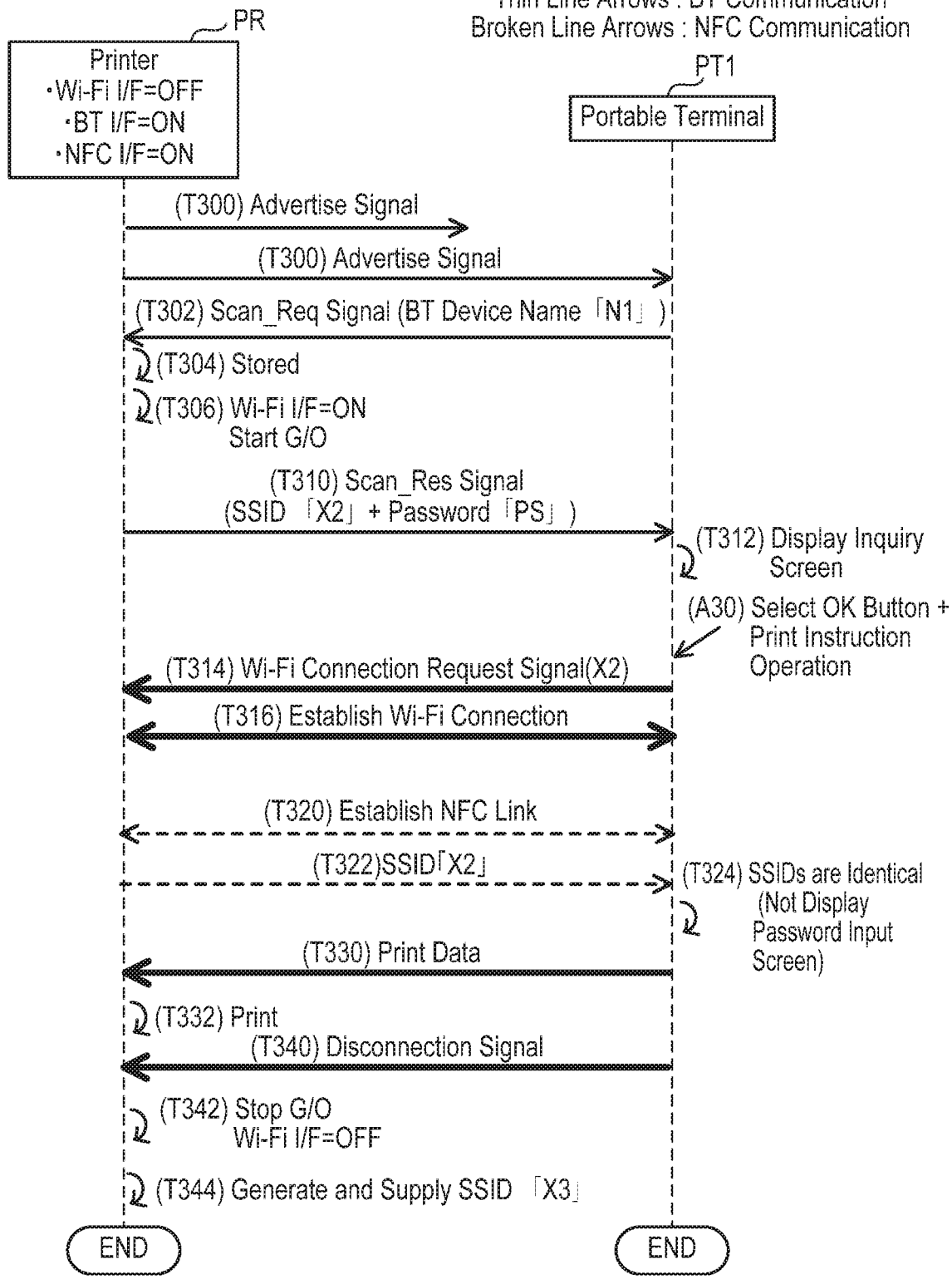
FIG. 7 shows a sequence chart for a case D1 of the second embodiment.
Figure 8:
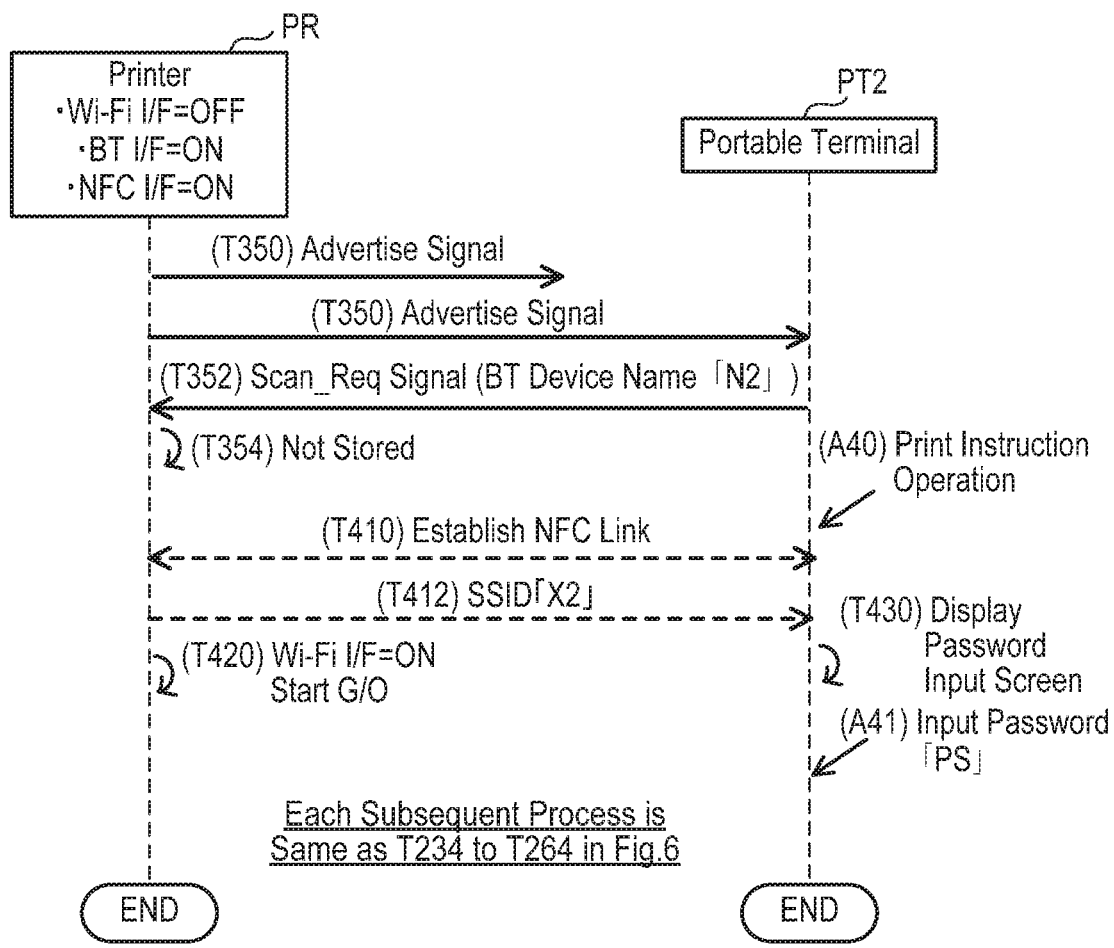
FIG. 8 shows a sequence chart for a case D2 of the second embodiment.

Next, specific cases of the present embodiment will be explained by referring to FIGS. 6 to 8. In FIGS. 6 to 8, thick line arrows, thin line arrows, and broken line arrows between the printer PR and the portable terminals PT1, PT2 indicate respectively Wi-Fi communications, BT communications, and NFC communications.

(Case C; FIG. 6)

In an initial state of a case C, the power supply to the printer PR is turned OFF. Also, no portable terminal BT device names are stored in the BT device name storing area 40 in the memory 34 of the printer PR.

In A0, the power supply to the printer PR is turned ON by the user. In this case, in T200, the printer PR changes the NFC I/F 24 to the ON state, generates the SSID "X1", supplies the SSID "X1" to the NFC I/F 24, and causes the SSID "X1" to be stored in the memory 26 (S2 of FIG. 2).

In A20, the print instruction operation is performed on the portable terminal PT1 by the user. Then, the user approaches the portable terminal PT1 to the printer PR. Consequently, the distance between the printer PR and the portable terminal PT1 becomes shorter than the maximum distance over which it is possible to perform the NFC communication (e.g. 10 cm), and as a result, in T210, the NFC link is established between the printer PR and the portable terminal PT1.

As described above, the SSID "X1" is stored in the memory 26 of the NFC I/F 24 in the printer PR (T200). Then, when an NFC link is established, in T212, the NFC I/F 24 sends, to the portable terminal PT1, the SSID "X1" in the memory 26 without receiving an instruction from the CPU 32 of the controller 30. However, the password "PS" is not sent to the portable terminal PT1 at this point. T220 is the same as T10 of FIG. 4 (S12 of FIG. 2).

The portable terminal PT1, in a case where the SSID "X1" is received from the printer PR, determines whether or not the Scan_Res signal is received in accordance with the BT communication within a predetermined time period prior to receiving the SSID "X1". In the case C, the portable terminal PT1 determines that the Scan_Res signal is not received within the predetermined time period, and in this case, in T230, displays the password input screen. Furthermore, in the case where it is determined that the Scan_Res signal is received within the predetermined time period, the portable terminal PT1 determines whether or not the SSID "X1" received in accordance with the NFC communication and the SSID included in the Scan_Res signal received in accordance with the BT communication are identical. Then, in the case where it is determined that the two SSIDs are not identical, the portable terminal PT1 displays the password input screen. Also, in a case where it is determined that the two SSIDs are identical, the portable terminal PT1 does not display the password input screen, in which case T324 and the subsequent processes of FIG. 7 which will be explained below are performed.

In A21, an operation for inputting the password "PS" is performed on the portable terminal PT1 by the user. T234 to T264, which are performed following A21, are the same as T34 to T64 of FIG. 4 (S20 to S32 of FIG. 2). However, in T264, the generated SSID "X2" is stored in the memory 26 of the NFC I/F 24.

(Case D1; FIG. 7)

A case D1 of FIG. 7 is a continuation of the case C, and the Wi-Fi I/F 20 is in the OFF state (refer to T262 of FIG. 6), the BT I/F 22 is in the ON state (refer to T244), and the NFC I/F 24 is in the ON state. Furthermore, the printer application 78 is not running in the portable terminal PT1, which is the connection-established terminal, but the inquiry application 80 is running.

T300 to T316 are the same as T100 to T116 of FIG. 5 (S40 to S46 of FIG. 2, and S80 to S92 of FIG. 3). Also, A30 is the same as A10 of FIG. 5. The user approaches the portable terminal PT1 to the printer PR after performing the operation of A30. Consequently, in T320, the NFC link is established between the printer PR and the portable terminal PT1.

The SSID "X2" is stored in the memory 26 of the NFC I/F 24 of the printer PR (T264 of FIG. 6). Then, when the NFC link is established, in T322, the NFC I/F 24 sends the SSID "X2" in the memory 26 to the portable terminal PT1.

The portable terminal PT1, in a case where the SSID "X2" is received from the printer PR, determines that the Scan_Res signal has been received in accordance with the BT communication within the predetermined time period prior to receiving the SSID "X2" (refer to T310), and, in addition, in T324, determines that the SSID "X2" received in accordance with the NFC communication and the SSID "X2" included in the Scan_Res signal received in accordance with the BT communication are identical. In this case, the portable terminal PT1, in T330, uses the Wi-Fi connection so as to send the printer PR the print data specified in A30 without displaying the password input screen. T332 to T344 are the same as T132 to T144 of FIG. 5 (S48 to S54 of FIG. 2). However, in T344, the generated SSID "X3" is stored in the memory 26 of the NFC I/F 24.

(Case D2; FIG. 8)

A case D2 of FIG. 8 is also a continuation of the case C. The BT device name "N2" of the portable terminal PT2 is not stored in the BT device name storing area 40 in the memory 34 of the printer PR.

T350 to T354 are the same as T150 to T154 of FIG. 5. In T154, the printer PR determines that the BT device name "N2" included in the Scan_Req signal is not stored in the BT device name storing area 40 (NO in S84), maintains the Wi-Fi I/F 20 in the OFF state, and does not shift to the G/O state. Also, the printer PR does not send the Wi-Fi setting information including the SSID "X2" and the password "PS" to the portable terminal PT2.

A40 and A41 are the same as A20 and A21 of FIG. 6 with the exception of being performed on the portable terminal PT2. Also, T410 to T430 are the same as T210 to T230 of FIG. 6 (YES in S10, and S12 of FIG. 2). Also, the processes subsequent to T430 are the same as T234 to T264 of FIG. 6.

(Effects of the Present Embodiment)

As shown in the case D2 of FIG. 8, since the possibility of establishing the Wi-Fi connection with the portable terminal PT2 is low in a case where the BT device name "N2" received in accordance with the BT communication is not stored in the BT device name storing area 40 (T354), the printer PR maintains the Wi-Fi I/F 20 in the OFF state, and maintains the device state without shifting to the G/O state until the NFC link is established (T410). Therefore, the printer PR is able to realize power savings. On the other hand, as shown in the case D1 of FIG. 7, since the possibility of establishing the Wi-Fi connection with the portable terminal PT1 is high in a case where the BT device name "N1" received in accordance with the BT communication is stored in the BT device name storing area 40 (T304), the printer PR changes the Wi-Fi I/F 20 to the ON state, and shifts to the G/O state (T306). As a result, in a case where the Wi-Fi connection request is received from the portable terminal PT1, which is the connection-established terminal (T314), the printer PR can appropriately establish a Wi-Fi connection with the portable terminal PT1 (T316).

In particular, in the present embodiment, as the establishing of the NFC link between the printer PR and the portable terminals PT1 and PT2 is a trigger, print data is sent to the printer PR from the portable terminals PT1, PT2 (T250 of FIG. 6, and T330 of FIG. 7). In the case C of FIG. 6, the printer PR shifts to the G/O state when the NFC link is established (T220). However, after the printer PR starts the process of shifting to the G/O state, a certain amount of time (e.g. 10 seconds) is required for the shift to the G/O state to be completed. Therefore, a certain period of time is required from when the user brings the portable terminal PT1 close to the printer PR and the NFC link is established until the printing is performed (T252). By contrast, in the case D1 of FIG. 7, the printer PR shifts to the G/O state (T306) in accordance with performing the BT communication (T302), which is a longer distance wireless communication than the NFC communication. Therefore, normally the printer PR has completed the shift to the G/O state when the user approaches the portable terminal PT1 to the printer PR and the NFC link is established (T320). Thus, printing is quickly performed (T332) after the user approached the portable terminal PT1 to the printer PR and the NFC link was established. That is, the printer PR is able to perform printing quickly in accordance with the instruction (i.e. establish NFC link) from the portable terminal PT1, which is the connection-established terminal. This enables the printer PR to appropriately perform the wireless communication according to a plurality of communication schemes including the Wi-Fi scheme, the BT scheme, and the NFC scheme.

(Corresponding Relationships)

The NFC scheme and the NFC I/F 24, respectively, are examples of a "third communication scheme" and a "third interface". The SSID "X1" sent in T212 of FIG. 6 is an example of "second network-related information".

(Variation 1)

In the embodiments, the printer PR changes the Wi-Fi I/F 20 to the ON state in S12 or S42 of FIG. 2. Alternatively, the Wi-Fi I/F 20 may be constantly maintained in the ON state while the power supply to the printer PR is ON.

(Variation 2)

In the embodiments, the "first state" of the "first interface" is the OFF state, in which power is not supplied to the Wi-Fi I/F 20. Alternatively, the "first state" may be a state in which a small amount of power is supplied to the Wi-Fi I/F 20. In this case, the "first state" may be a state in which it is possible to perform a wireless communication via the Wi-Fi I/F 20, and may be a state in which it is not possible to perform a wireless communication via the Wi-Fi I/F 20. However, in the case of the former, for example, the "first state" may be a state in which the communication speed is slower than the "second state". Also, in the case of the former, for example, the "first state" may be a state in which it is not possible to perform a communication of a high layer (e.g. the application layer) which is higher than a datalink layer of a OSI reference model, and is possible to perform a communication of a low layer which is lower than or equal to the datalink layer of a OSI reference model.

(Variation 3)

In the first embodiment, in T110 of FIG. 5, the printer PR sends the SSID "X2" and the password "PS" to the portable terminal PT1. Alternatively, the printer PR may send the portable terminal PT1 the SSID "X2", but need not send the password "PS" to the portable terminal PT1. In this case, the password input screen is displayed on the portable terminal PT1, and the password is inputted to the portable terminal PT1 by the user. In the present variation, only the SSID "X2" is an example of the "first network-related information".

(Variation 4)

In the embodiments, in S24 of FIG. 2, the printer PR uses the Wi-Fi connection so as to receive the BT device name from the portable terminal. Alternatively, the printer PR, for example, may use the BT communication so as to receive the BT device name from the portable terminal. Also, in the second embodiment, the printer PR, for example, may use the NFC communication so as to receive the BT device name from the portable terminal. For example, the printer PR may use the NFC link established in T210 of FIG. 6 so as to receive the BT device name "N1" from the portable terminal PT1.

(Variation 5)

The printer PR need not support WFD and alternatively may support a so-called SoftAP. In this case, in S12 and S42 of FIG. 2, the printer PR runs the SoftAP, and in S30 and S52, stops the SoftAP. In the present variation, a state in which the SoftAP is not running and a state in which the SoftAP is running, respectively, are examples of the "non-parent station state" and the "parent station state".

(Variation 6)

The printer PR may store other information for identifying the portable terminal (e.g. a MAC address, an IP address, or the like) instead of storing the BT device name of the portable terminal. In the present variation, the aforementioned other identification information is an example of "apparatus identification information".

(Variation 7)

In the embodiments, the printer PR password is fixed information, but the SSID of the printer PR changes each time the printer PR stops the G/O state. Alternatively, both the SSID and the password of the printer PR may be fixed information. Then, in S92 of FIG. 3, the printer PR may send a Scan_Res signal including neither the SSID nor the password to the portable terminal. In this case, the portable terminal PT1 stores both the SSID and the password of the printer PR when the Wi-Fi connection with the printer PR is established in T36 of FIG. 4 or T236 of FIG. 6. Instead of T110 of FIG. 5 or T310 of FIG. 7, the portable terminal PT1, in a case where the Scan_Res signal including neither the SSID nor the password is received, displays the inquiry screen in either T112 or T312, and uses the stored SSID and password to establish the Wi-Fi connection with the printer PR in T114 and T116 (or T314 and T316).

(Variation 8)

The printer PR in the first embodiment may comprise the NFC I/F 24 without comprising the BT I/F 22. Then, the printer PR may store other information for identifying the connection-established terminal (e.g. a MAC address) instead of storing the BT device name of the connection-established terminal. In the present variation, in S70 and S74 of FIG. 3, the printer PR controls the state of the NFC I/F 24 instead of the BT I/F 22. Also, the printer PR monitors for the NFC link to be established in S82 without performing S80, and in S84, uses the NFC link to receive identification information of the portable terminal, and determines whether or not the identification information has been stored. The printer PR, in a case where it is determined that the identification information of the portable terminal has been stored (YES in S84), performs S90, and, in addition, in S92, uses the NFC communication to send the SSID and the password to the portable terminal. Also, instead of T102 of FIG. 5, the portable terminal PT1 may use the NFC communication so as to send the identification information to the printer PR, and instead of T110, may use the NFC communication so as to receive the SSID and the password from the printer PR, and thereafter perform T112 and subsequent processing. In the present variation, and NFC scheme and the NFC I/F 24 are examples of the "second communication scheme" and the "second interface", respectively.

(Variation 9)

In variation 8, both the SSID and the password of the printer PR may be fixed information. In this case, the printer PR need not perform S92 of FIG. 3. Instead of T102 of FIG. 5, the portable terminal PT1, after using the NFC communication so as to send the identification information to the printer PR, uses the stored SSID and password to establish the Wi-Fi connection with the printer PR in T114 and T116 without performing T110 and T112.

(Variation 10)

In the second embodiment, the printer PR may supply both the SSID and the password to the NFC I/F in S2, S32, and S54 of FIG. 2. In this case, the printer PR need not perform S92 of FIG. 3. The portable terminal PT1 may receive the SSID "X1" and the password "PS" from the printer PR in T212 of FIG. 6, and may use the received SSID "X1" and password "PS" so as to establish the Wi-Fi connection with the printer PR in T234 and T236 without displaying the password input screen (i.e. without performing T230). However, in this case, since the printer PR shifts to the G/O state in accordance with the NFC link being established in T210, a certain period of time is required from when the NFC link is established (T210) until the printing is performed (T252). Also, T310, T312, A30, T314, and T316 of FIG. 7 may not be performed. Then, in T322, the portable terminal PT1 may receive the SSID "X1" and the password "PS" from the printer PR, and thereafter may use the received SSID "X1" and password "PS" so as to establish the Wi-Fi connection with the printer PR. In this case, since the printer PR shifts to the G/O state in accordance with the Scan_Req signal being received in T302, the printer PR normally completes the shift to the G/O state at the time the NFC link is established in T320. Therefore, after the NFC link has been established in T320, printing is performed quickly (T332). This enables the printer PR to quickly perform printing in accordance with the instruction (i.e. establish NFC link) from the portable terminal PT1, which is the connection-established terminal. The "second network-related information" may include the network identification information and the password as in the present variation.

(Variation 11)

In the embodiments, the BT I/F 22 may be maintained in the ON state while the power supply to the printer PR is ON. Then, the printer PR may repeatedly send the Advertise signal while the printer PR power supply is ON. That is, the "communication apparatus" may repeatedly send a specific signal to the exterior regardless of whether or not the apparatus identification information is stored in the memory.

(Variation 12)

In the embodiments, the printer PR may monitor for receiving the Advertise signal including the BT device name in S82 from the portable terminal without sending the Advertise signal in S80 of FIG. 3. Then, in S84, the printer PR may determine whether or not the portable terminal BT device name included in the Advertise signal has been stored, and in S92, for example, may send the portable terminal the Scan_Req signal including the SSID and the password of the printer PR.

(Variation 13)

In the embodiments, in S92 of FIG. 3, the printer PR may establish a BT-scheme logical link (i.e. a BT connection) with the portable terminal, and use the BT connection so as to send the portable terminal the SSID and the password. That is, the "communication apparatus" may send the first network-related information to the specific external apparatus without establishing the wireless connection according to the second communication scheme as in the embodiments described above, and may send the first network-related information to the specific external apparatus by establishing the wireless connection according to the second communication scheme as in the present variation.

(Variation 14)

In the embodiments, the BT I/F 22 of the printer PR may comprise a CPU and a memory. The memory of the BT I/F 22 may store a program beforehand. The CPU of the BT I/F 22 may be capable of performing the BT communication in accordance with the program in the BT I/F 22 memory without ever receiving the instruction from the CPU 32 of the controller 30. Generally, the "communication apparatus" may comprise two or more processors (e.g. the CPU 32 in the controller 30 of the printer PR and the CPU in the BT I/F 22), and two or more memories (e.g. the memory 34 in the controller 30 and the memory in the BT I/F 22), and the respective processors may perform processes in accordance with the respective programs stored in the respective memories.

(Variation 15)

In the second embodiment, in S2, S32 or S54 of FIG. 2, the CPU 32 of the printer PR supplies the current SSID to the NFC I/F 24, and causes the current SSID to be stored in the memory 26 of the NFC I/F 24. As a result, in a case where the NFC link is established with the portable terminal, the NFC I/F 24 is able to send the portable terminal the current SSID even without receiving the instruction from the controller 30 (i.e. the CPU 32). Alternatively, in a case where the NFC link is established with the portable terminal, the NFC I/F 24 may notify the controller 30 (i.e. the CPU 32) that the NFC link has been established, obtain the current SSID from the controller 30, and send the current SSID to the portable terminal. Generally speaking, the "third interface" may use the communication link so as to send the second network-related information to the specific external apparatus.

(Variation 16)

In the second embodiment, the print data communication of T330 may be performed immediately after the Wi-Fi connection has been established in T316 without T320 to T324 of FIG. 7 being performed.

(Variation 17)

In the embodiments, the portable terminal PT1, in a case where the Scan_Res signal is received in T110 of FIG. 5 or T310 of FIG. 7, may send the Wi-Fi connection request signal to the printer PR in T114 or T314 without displaying the inquiry screen in T112 or T312.

(Variation 18)

The "first interface" may not be the I/F for performing the Wi-Fi communication, but alternatively may be an I/F for performing the wireless communication according to another communication scheme that is capable of forming a wireless LAN. Also, the "second interface" may not be the I/F for performing the BT communication, but alternatively, for example, may be an I/F for performing the wireless communication according to another communication scheme capable of performing a near field wireless communication (e.g. TransferJet (registered trademark) scheme).

(Variation 19)

The "communication apparatus" may not be the printer PR, but alternatively, for example, may be a scanner. In this case, for example, instead of receiving print data from the portable terminal PT1 in T50 of FIG. 4 or T130 of FIG. 5, the scanner may send the portable terminal PT1 scan data generated by performing a scan of a document. Also, the "communication apparatus" may be an apparatus that differs from a printer and a scanner (e.g. a copy machine, a facsimile machine, a telephone set, a PC, a server, a portable terminal, or the like). Also, the "specific external apparatus" may not be the portable terminal, but alternatively may be another apparatus (e.g. a printer, a scanner, a copy machine, a facsimile machine, a telephone set, a desktop PC, a server, or the like).

(Variation 20)

In the embodiments, the processes of FIG. 2 to FIG. 8 are realized by the CPU 32 of the printer PR executing the program 36 (i.e. the software). Alternatively, at least one of the processes from among the processes of FIG. 2 to FIG. 8 may be realized by a logic circuit or other such hardware.

What is claimed is:

1. A communication apparatus comprising:
   a first interface configured to perform a wireless communication according to a first communication scheme;
   a second interface configured to perform a wireless communication according to a second communication scheme different from the first communication scheme;
   a processor; and
   a memory configured to store first information,
   wherein the processor is configured to perform:
      receiving second information via the second interface from an external apparatus;
      shifting an operating state of the communication apparatus from a non-parent station state to a parent station state in a case where the second information corresponding to the first information is received, the parent station state being a state in which the communication apparatus operates as a parent station of a wireless network for performing a wireless communication via the first interface, and the non-parent station state being a state different from the parent station state, wherein the operating state of the communication apparatus is maintained in the non-parent station state in a case where the second information not corresponding to the first information is received; and
      establishing a first wireless connection with the external apparatus via the first interface so as to form the wireless network in which the communication apparatus operates as the parent station and the external apparatus operates as a child station, after the operating state of the communication apparatus has been shifted from the non-parent station state to the parent station state.

2. The communication apparatus as in claim 1, further comprising:
   a print performing unit,
   wherein the processor is further configured to perform:
   receiving print data from the external apparatus via the first interface by using the wireless network after the first wireless connection has been established with the external apparatus; and
   causing the print performing unit to print in accordance with the print data in response to receiving the print data.

3. The communication apparatus as in claim 2, wherein the processor is further configured to perform:
   receiving a disconnection signal via the first interface by using the wireless network from the external apparatus after receiving print data from the external apparatus; and
   disconnecting the first wireless connection in response to receiving the disconnection signal.

4. The communication apparatus as in claim 2, wherein the processor is further configured to perform:
   shifting the operating state of the communication apparatus from the parent station state to the non-parent station state after receiving print data from the external apparatus.

5. The communication apparatus as in claim 1, wherein the first interface is configured to be set in any one state among a plurality of states including a first state and a second state in which power consumption is higher than the first state, and
   the processor is further configured to perform:
   shifting a state of the first interface from the first state to the second state in the case where the second information corresponding to the first information is received while the state of the first interface is the first state.

6. The communication apparatus as in claim 5, further comprising:
   a print performing unit,
   wherein the processor is further configured to perform:
   receiving print data from the external apparatus via the first interface by using the wireless network after the first wireless connection has been established with the external apparatus;
   causing the print performing unit to print in accordance with the print data in response to receiving the print data; and
   shifting the state of the first interface from the second state to the first state after receiving print data from the external apparatus.

7. The communication apparatus as in claim 1, wherein the first information is identification information for identifying an apparatus with which the communication apparatus has established a wireless connection via the first interface, and
   the second information is identification information for identifying the external apparatus.

8. The communication apparatus as in claim 7, wherein the first information is a name allocated to an Bluetooth interface of an apparatus with which the communication apparatus has established a wireless connection via the first interface, and
   the second information is a name allocated to an Bluetooth interface of the external apparatus.

9. The communication apparatus as in claim 7, wherein the first information is a MAC address of an apparatus with which the communication apparatus has established a wireless connection via the first interface, and
   the second information is a MAC address of the external apparatus.

10. The communication apparatus as in claim 7, wherein the first information is an IP address of an apparatus with which the communication apparatus has established a wireless connection via the first interface, and
    the second information is an IP address of the external apparatus.

11. The communication apparatus as in claim 1, wherein the first communication scheme includes a Wi-Fi scheme, and
    the first interface is configured to perform a wireless communication according to the Wi-Fi scheme.

12. The communication apparatus as in claim 1, wherein the second communication scheme includes a Bluetooth scheme, and
    the second interface is configured to perform a wireless communication according to the Bluetooth scheme.

13. The communication apparatus as in claim 12, wherein the Bluetooth scheme is based on a standard using version 4.0 or a later version of the Bluetooth scheme.

14. The communication apparatus as in claim 1, wherein the first wireless connection is established in a case where a predetermined instruction is given from a user to the external apparatus under a situation where an inquiry screen is displayed on the external apparatus, the inquiry screen being for inquiring of the user whether a wireless connection according to the first communication scheme is to be established between the communication apparatus and the external apparatus.

15. The communication apparatus as in claim 1, wherein the parent station state is a G/O state of Wi-Fi Direct scheme.

16. The communication apparatus as in claim 1, wherein the non-parent station state is a device state of Wi-Fi Direct scheme.

17. The communication apparatus as in claim 1, wherein the parent station state is a state in which a SoftAP is running.

18. The communication apparatus as in claim 1, wherein the non-parent station state is a state in which a SoftAP is not running.

19. A non-transitory computer-readable recording medium storing computer-readable instructions for a communication apparatus, the communication apparatus comprising: a first interface configured to perform a wireless communication according to a first communication scheme; a second interface configured to perform a wireless communication according to a second communication scheme different from the first communication scheme; and a processor;
wherein the computer-readable instructions, when executed by the processor, cause the communication apparatus to perform:
receiving second information via the second interface from an external apparatus;
shifting an operating state of the communication apparatus from a non-parent station state to a parent station state in a case where the second information corresponding to the first information is received, the parent station state being a state in which the communication apparatus operates as a parent station of a wireless network for performing a wireless communication via the first interface, and the non-parent station state being a state different from the parent station state, wherein the operating state of the communication apparatus is maintained in the non-parent station state in a case where the second information not corresponding to the first information is received; and
establishing a first wireless connection with the external apparatus via the first interface so as to form the wireless network in which the communication apparatus operates as the parent station and the external apparatus operates as a child station, after the operating state of the communication apparatus has been shifted from the non-parent station state to the parent station state.

20. A method implemented by a communication apparatus having a first interface configured to perform a wireless communication according to a first communication scheme, a second interface configured to perform a wireless communication according to a second communication scheme different from the first communication scheme, and a memory configured to store first information, the method comprising:
receiving second information via the second interface from an external apparatus;
shifting an operating state of the communication apparatus from a non-parent station state to a parent station state in a case where the second information corresponding to the first information is received, the parent station state being a state in which the communication apparatus operates as a parent station of a wireless network for performing a wireless communication via the first interface, and the non-parent station state being a state different from the parent station state, wherein the operating state of the communication apparatus is maintained in the non-parent station state in a case where the second information not corresponding to the first information is received; and
establishing a first wireless connection with the external apparatus via the first interface so as to form the wireless network in which the communication apparatus operates as the parent station and the external apparatus operates as a child station, after the operating state of the communication apparatus has been shifted from the non-parent station state to the parent station state.

* * * * *